United States Patent Office 3,209,844
Patented Oct. 5, 1965

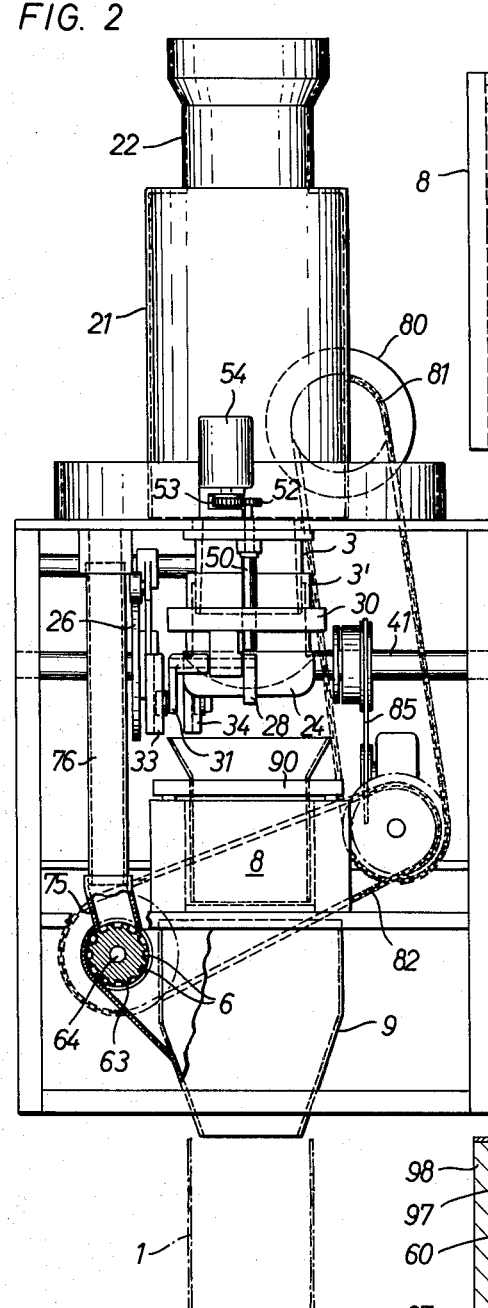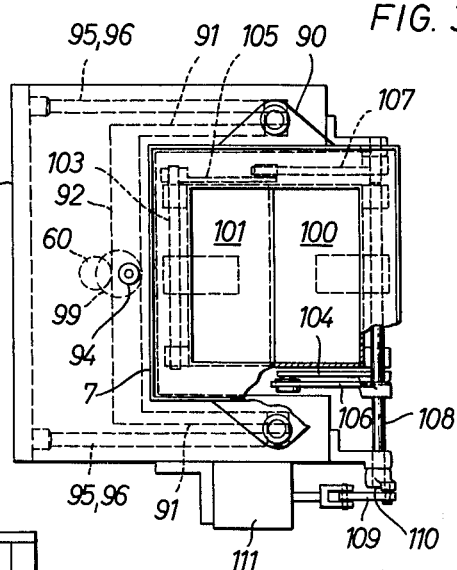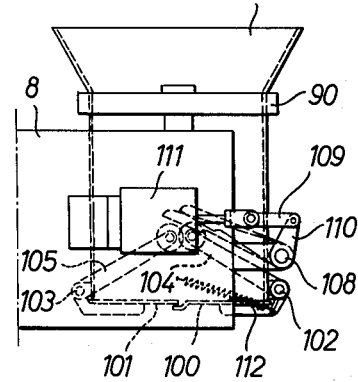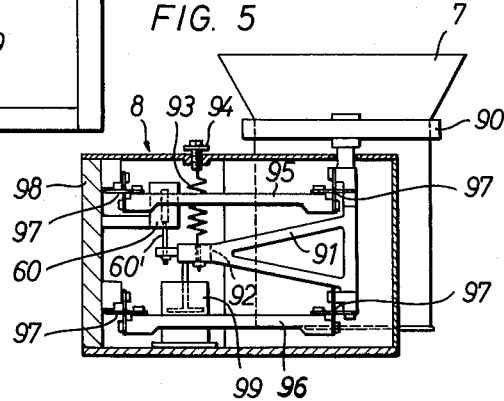

3,209,844
APPARATUS FOR WEIGHING OUT
FLOWABLE MATERIALS
Adolf Stambera, Stuttgart-Bad Cannstatt, and Kurt Braun, Esslingen (Neckar), Germany, assignors to Fr. Hesser Maschinenfabrik-Aktiengesellschaft, Stuttgart-Bad Cannstatt, Germany, a corporation of Germany
Filed Nov. 29, 1963, Ser. No. 327,882
Claims priority, application Great Britain, Dec. 3, 1962, 45,640/62
6 Claims. (Cl. 177—64)

This invention is concerned with an apparatus for measuring out by weight individual quantities of loose and flowable filling materials.

A known kind of apparatus for this purpose basically comprises dispensing means for dispensing a quantity of filling material of a weight below a chosen target weight, a weighing device adapted to receive this dispensed quantity of material from the dispensing means and weigh it to determine its weight deficiency from the target weight, a plurality of measuring devices adapted to hold small make-up quantities of filling material, and means controlled by the weighing device for adding to the aforesaid dispensed quantity of material the contents of one or more of said measuring devices in accordance with the deficiency from the target weight determined by the weighing device, to thereby make the weight of the dispensed quantity up to the target weight.

It is an object of this invention to provide improvements in an apparatus of this kind.

In particular, an object is to provide measuring devices which are of a particularly advantageous form and produce a particularly efficient and simple control of the make-up.

A further object of the invention is to provide an apparatus of the aforesaid kind which achieves high filling capacities with maximum accuracy of weight, particularly when a rapidly operating weighing device, for example an electrically detected spring weigher, is used for determining the weight deficiency from each of the quantities of material received from the dispensing means.

To meet these objects, in accordance with the present invention, the measuring devices are in the form of a series of chambers provided around the periphery of a rotary member which is mounted below a filling material-supply and can be turned through an angular distance dependent on the weight deficiency determined by the weighing device so that the contents of one or more of the chambers constituting the measuring devices are added to the quantity of filling material weighed by the weighing device to make the weight of this quantity up to the target weight, the chambers being filled with material from the material-supply during such turning of the rotary member.

Other features and many of the attendant advantages of the invention will become more fully apparent upon consideration of the following description of two embodiments of apparatus according to the invention, given with reference to the accompanying drawings.

Figure 1:
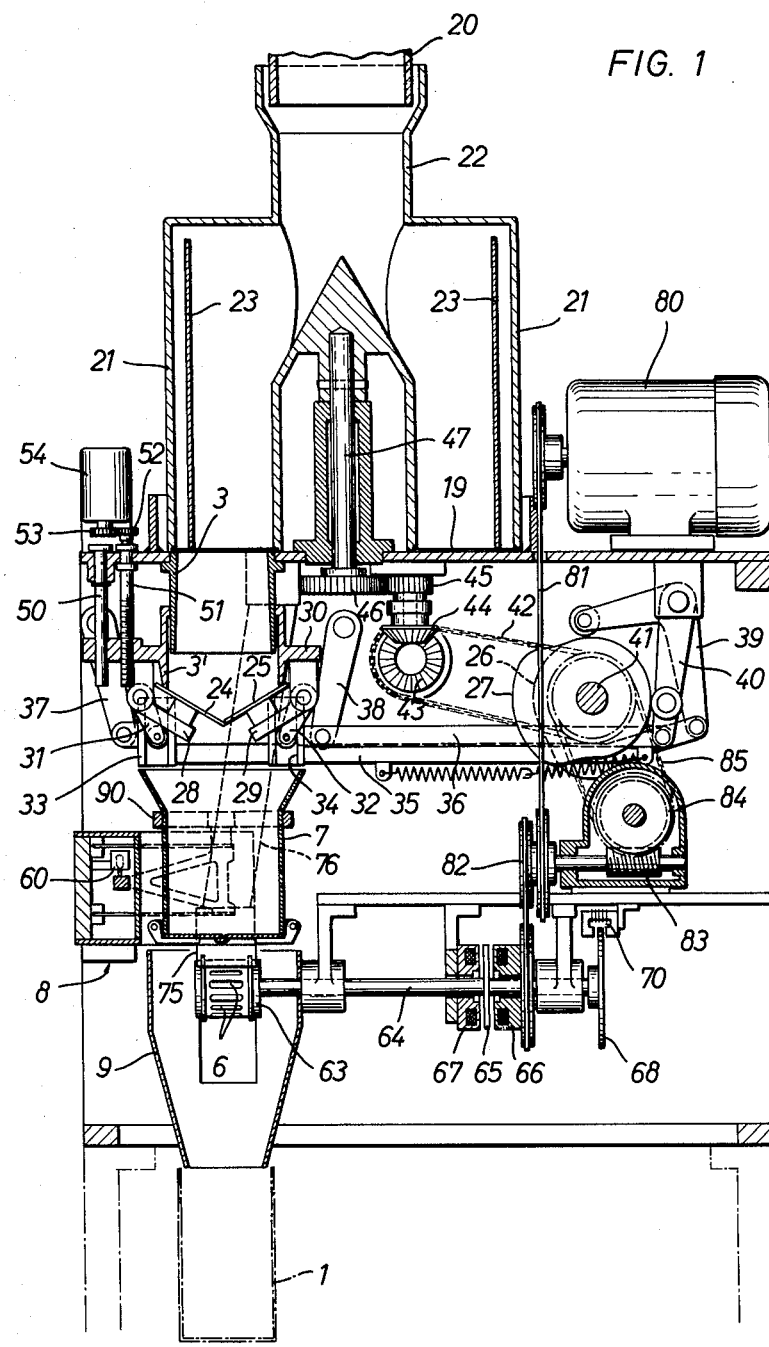
Figure 6:
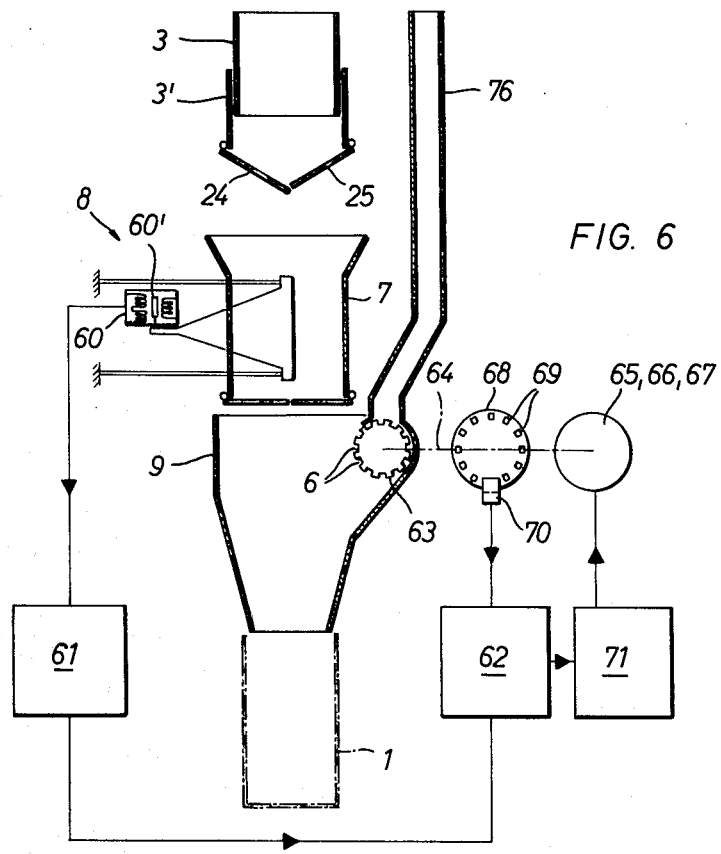
Figure 7:
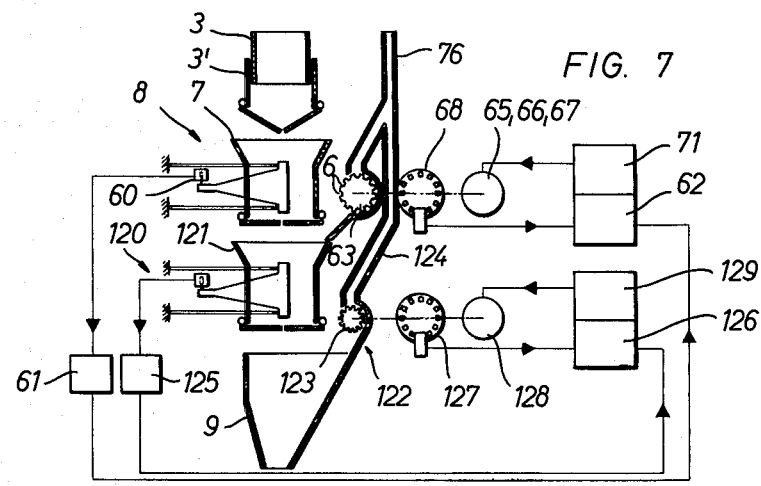

In these drawings:

FIGURE 1 is a cross section through the first embodiment of apparatus,

FIGURE 2 is a front view, partly in section, of the apparatus illustrated in FIGURE 1, FIGURE 3 is a plan view of the weighing device used in the apparatus, FIGURE 4 is a side view of the weighing device after this has been discharged from the weighing device shown in FIGURE 3, FIGURE 5 is a cross section through the weighing device shown in FIGURES 3 and 4, FIGURE 6 is a wiring diagram of the electrical circuit of the apparatus, and FIGURE 7 is a wiring diagram of the electrical circuit of the second embodiment of apparatus which is shown diagrammatically.

The embodiment of apparatus illustrated in FIGURES 1 to 6 of the drawings is adapted to measure out individual quantities of loose and flowable filling materials of specific weights and to discharge these quantities into packaging containers 1. More particularly, the apparatus, which operates with a high output, is adapted to be used in completely automatic packaging machines in which the individual measured-out quantities of material are fed by stationary or movable feed means of known form (not shown) into the packaging containers.

The filling material to be measured out is supplied in a freely flowing stream to the apparatus through a stationary tube 20. This stream of filling material passes into a feed member 22 which has two branches 21 and is continuously rotated about its vertical axis. Located beneath the feed member 22, the downwardly-open branches 21 of which are closed by a fixed plate 19 over a part of their path of rotation, and in this path is an upwardly-open adjustable measuring chamber 3, 3' which, each time the branches 21 are moved, is completely filled with material from the relevant branch 21 brought into position above the chamber 3, 3'. The bottom of the measuring chamber 3, 3' is formed by two flaps 24, 25 which are controlled respectively by cam plates 26, 27 so that, after filling of the measuring chamber 3, 3', the volumetrically measured-out quantity of material in the chamber 3, 3' is discharged into a weighing container 7, arranged beneath the measuring chamber, of a weighing device 8.

In order that the air in the measuring chamber 3, 3' is rapidly evacuated when the measuring chamber is filled through one of the branches 21 of the feed member 22, there is inserted into each of the branches 21 a partition 23 which forms a channel which is at least partially coincident with the measuring chamber 3, 3'.

To allow for pivoting of the flaps 24, 25 of the measuring chamber 3, 3', these flaps are respectively secured to arms 28, 29 which are pivotally mounted on a ring 30 surrounding the lower part 3' of the measuring chamber and are rigidly connected to levers 31, 32 having at their outer ends rollers running in guides 33, 34 respectively.

These guides 33, 34 are secured to links 35, 36 which are articulated at their front ends to swingable arms 37, 38. The rear end of the link 35 is coupled to a bell crank lever 39 which is rhythmically swingable by the cam plate 26, and the rear end of the link 36 is coupled to a lever 40 movement of which is controlled by the cam plate 27. The two cam plates 26, 27 are mounted on a continuously rotating control shaft 41 and are of such a design that, for each revolution of this control shaft 41, the flaps 24, 25 are opened and then closed, whereby a quantity of filling material is dispensed from the measuring chamber 3, 3'.

The rotary movement of the feed member 22 is derived from the control shaft 41, being transmitted through a chain drive 42, bevel gears 43, 44 and spur gears 45, 46 to a vertical shaft 47 to which the feed member 22 is rigidly secured. The spur gears 45, 46 have a reduction gear ratio of 2:1 so as to produce the required correlation between the movement of the two branches 21 of the feed member 22 and the control of the measuring chamber 3, 3'.

To allow for adjustment of the measuring chamber 3, 3' to a specific measuring-out volume, the lower part 3' of the chamber is telescopically adjustable relatively to the upper part 3, a fixed pin 50 mounted in the ring 30 on the part 3' serving to guide the parts 3, 3' during their relative movement. Movement of the part 3' relatively to the part 3 of the measuring chamber is effected by rotation of a screw 51 which is screwed into the ring 30 and is connected through a pair of spur gears 52, 53 to an electrical adjusting motor 54. There is a decrease or increase in the measuring-out volume of the measuring chamber 3, 3' depending on the direction of rotation of the motor 54 and screw 51.

The measuring-out volume of the measuring chamber 3, 3' is preferably so set that the measured-out quantities of material are of a weight a little below the target weight, a weight deficiency of about 5% being aimed at. The adjusting motor 54 is so controlled by the weighing device 8 that, if there are variations in the density of the filling material, this 5% weight deficiency is generally maintained.

The quantities of material volumetrically measured-out in this way have their actual weight checked by the weighing device 8, and the weight deficiency from the target weight is thereby determined. The deflection of the weighing device 8 determined by the weight of the quantity of material in the weighing container 7 of the device is preferably detected inductively by means of a differential transformer 60 of the kind known per se. This transformer is set so that, when a weight is checked which is the same as the target weight, a zero potential is produced whereas, when the individual quantity of material in the container 7 has a weight deficiency, an electrical potential signal corresponding to the weight deficiency is produced at the output of the differential transformer. This signal is fed to an analogue-digital transducer 61 (FIGURE 6) of the known kind and there converted into a number of electrical impulses which corresponds to the value of the potential of the signal and hence to the number of units of weight deficient. These impulses are counted in an electronic evaluating device 62 and the amount of impulses counted is temporarily stored. The arrangement is that a number of small make-up quantities of material is added to each measured-out and weighed quantity of material in accordance with the number of impulses stored, the weight of each of these small make-up quantities corresponding to one unit of weight deficient referred to above.

Associated with the discharge hopper 9, through which the main quantity of material is dispensed from the weighing container 7 into the packaging container 1 concerned immediately after the weighing of the material, is a make-up device which comprises a rotary member 63, in this case a cylinder, having around its periphery a plurality of regularly spaced measuring devices 6 in the form of chambers constituted by grooves formed in the cylinder for measuring out the small make-up quantities. This rotary member 63 is mounted on a spindle 64 which is driven through a clutch plate 65 and an electro-magnetic clutch 66. The plate 65 also has associated therewith a fixed electro-magnetic brake 67 which, when the clutch 66 is disengaged from the plate 65, brakes the latter and hence the spindle 64 and brings it to a halt. Mounted on the end of the spindle 64 remote from the rotary member 63 is a plate 68 of a non-magnetic material having at regularly spaced intervals around and adjacent to its periphery an annular series of magnetic plates 69 corresponding in number to the measuring devices 6 (see FIGURE 6). Upon turning of the spindle 64, these plates 69 produce electrical impulses in a stationary coil 70, each of which corresponds to one measured-out small make-up quantity added to the main quantity of material. As shown in FIGURE 6, these impulses are also fed to the evaluating device 62 which either compares the amount of impulses, which have come from the transducer 61 and are stored in the evaluating device 62, with the amount of impulses coming from the counter 68, 69, 70, or subtracts the last-mentioned amount of impulses from the amount of stored impulses until the latter reaches zero. At this stage, when the number of small make-up quantities deficient has been added to the main quantity of material by the make-up device, the evaluating device 62 operates a relay 71 so that this relay disconnects the electro-magnetic clutch 66 and energises the electro-magnetic brake 67 with the result that the spindle 64 is arrested as quickly as possible. Switching in of the electro-magnetic clutch 66 and disconnection of the electro-magnetic brake 67 is also controlled by the evaluating device 62, in fact at a time when the evaluating device receives or has received impulses from the analogue-digital transducer.

As the rotary member 63 is turned, filling material enters the measuring devices 6 therein in readiness for transference into the discharge hopper 9. For this purpose, there is arranged above the rotary member 63 a fixed filling sleeve 75 the lower edge of which fits closely against the upper arcuate surface of the rotary member 63 and serves as a stripper for the measuring devices 6. This filling sleeve 75 is connected by a tube 76 to the plate 19 so that filling material passes through the plate 19 from the rotating feed member 22 into the tube 76 and the filling sleeve 75.

The drive for the clutch 66 and hence for the spindle 64 is derived from an electric motor 80, being transmitted through two chain drives 81 and 82. The first chain drive 81 also drives a worm gearing 83, 84 which imparts rotary movement to the control spindle 41 through a chain drive 85.

The weighing device 8 used in the apparatus illustrated is preferably a spring weigher. In this case, referring to FIGURES 3, 4 and 5, the weighing container 7 is mounted in a frame 90 which is rigidly connected at its sides to two triangular supports 91. These supports 91 are rigidly connected together by means of a transverse member 92. Attached to this transverse member 92 is a helical spring 93 which serves to exert a load distributing force on the weigher and is adjustable by means of an adjusting screw 94 mounted in the housing 98 of the weigher. The supports 91 are moved in a unison by two pairs of guide rods 95, 96, these rods being pivoted to the housing 98 and also to the supports 91 by means of cross strap hinges 97.

As stated above, deflection of the weigher is detected by the differential transformer 60. This transformer is fixed to the housing 98 whilst the movable core 60' thereof is rigidly connected to the transverse member 92 so that, when the weighing container 7 is loaded, the core 60' in the differential transformer 60 takes up an appropriate position and so controls the output potential of the transformer.

An oil damper 99 is provided for damping the movement of the weighing container 7, the piston of this damper being connected to the transverse member 92.

To allow for emptying of the weighing container 7, the latter is provided in the bottom thereof with two flaps 100, 101 which are rigidly connected to spindles 102, 103 rotatably mounted on the weighing container 7. Respectively secured to the spindles 102, 103 are levers 104, 105. The flaps 100, 101 are maintained closed by means of springs 112, and pivoting of the flaps against the action of these springs 112 to discharge the contents of the weighing container 7 is effected by swinging downwards the levers 104, 105 by means of further levers 106, 107. These levers 106, 107 are both mounted on a spindle 108 which, each time a quantity of material is to be discharged from the container 7, is turned through a specific angular distance through a link 109 and an arm 110 by an electro-magnet 111.

Control of this magnet 111 to effect emptying of the weighing container 7 is performed by an electrical contact which is not shown but which is closed each time the control spindle 41 performs one revolution.

The second embodiment of apparatus according to the present invention illustrated in FIGURE 7 is adapted to produce very accurately measured-out quantities of material. To this end, a main quantity of material is first measured out in the manner described above in the first embodiment, i.e. by weighing a dispensed quantity of material in the weighing container 7 and adding the weight of material deficient from this quantity to the latter by the make-up device 63.

Now, as a result of wide variations in the density of the material it can, of course, happen that since the small make-up quantities of material are measured-out volumetrically, the main quantities measured-out by the first embodiment of apparatus described above are below the smaller variations in weight. By checking the weight of the main quantity of material for a second time by means of second weighing device 120 having a weighing container 121, the weight of the material still deficient from the target weight is established and an appropriate number of fine make-up quantities is added as in the first embodiment described above by a make-up device 122 which measures out small make-up quantities of material. This make-up device 122 also comprises a rotary member 132 having around its periphery a plurality of measuring devices which are filled through a tube 124 connected to the tube 76. The make-up device 122 is controlled in the same way as the make-up device 63 by the weighing device 120, an analogue-digital transducer 125, an evaluating device 126, a counter 127, driving means 128 and a relay 129. Quantities of material having a very accurate weight are measured out by means of this second embodiment of apparatus since the quantities of filling material are subjected to a double weight check and correction.

We claim:

1. An apparatus for measuring out by weight individual quantities of loose and flowable materials, comprising a supporting frame; a material-dispensing device mounted on the supporting frame and adapted to measure out from material supplied thereto a quantity of material of a weight below a chosen target weight; a weighing device mounted on the supporting frame below the dispensing device so as to receive and weigh each quantity of material measured out by the dispensing device thereby to determine the weight deficiency of said quantity from the target weight; a rotary member which has provided around its periphery a series of chambers for measuring out from material supplied thereto small make-up quantities of material and which is arranged on the supporting frame so that the chambers thereof can discharge their contents into the quantity of material weighed by the weighing device; means mounted above said rotary member for supplying material to the chambers thereof; and means controlled by said weighing device for turning said rotary member through an angular distance dependent on the weight deficiency determined by the weighing device so that the contents of at least one of the chambers of the rotary member are discharged into the quantity of material weighed by the weighing device to make the weight of this quantity up to the target weight, the chambers being filled with material from the material-supply means during such turning of the rotary member wherein the rotary member is arranged on the supporting frame beneath the weighing device so that the chambers of the rotary member can discharge their contents into the quantities of material weighed by the weighing device after these quantities have been discharged from the weighing device.

2. An apparatus as claimed in claim 1, further comprising driving means for turning the rotary member, these driving means including a clutch for controlling the angular distance through which the rotary member is turned.

3. An apparatus for measuring out by weight individual quantities of loose and flowable materials, comprising a supporting frame; a material-dispensing device mounted on the supporting frame and adapted to measure out from material supplied thereto a quantity of material of a weight below a chosen target weight; a weighing device mounted on the supporting frame below the dispensing device so as to receive and weigh each quantity of material measured out by the dispensing device thereby to determine the weight deficiency of said quantity from the target weight; a rotary member which has provided around its periphery a series of chambers for measuring out from material supplied thereto small make-up quantities of material and which is arranged on the supporting frame so that the chambers thereof can discharge their contents into the quantity of material weighed by the weighing device; means mounted above said rotary member for supplying material to the chambers thereof; driving means for turning said rotary member; control means controlled by said weighing device for controlling the driving means; and a counter associated with the rotary member for determining the angular distance through which the rotary member is turned, this counter being adapted to feed this information to the aforesaid control means, whereby the rotary member is turned by the driving means under the control of said control means through an angular distance dependent on the weight deficiency determined by the weighing device so that the contents of at least one of the chambers of the rotary member are discharged into the quantity of material weighed by the weighing device to make the weight of this quantity up to the target weight, the said control means then stopping the driving means in response to the information that the rotary member has turned through the requisite angular distance fed from the counter.

4. An apparatus as claimed in claim 3, wherein the control means for controlling the drive means comprises an evaluating device which is connected to said counter which is adapted to feed to the evaluating device a number of impulses corresponding to the angular distance through which the rotary member is turned, and the evaluating device is also connected to an analogue-digital transducer which is controlled by the weighing device and is adapted to feed to the evaluating device a number of impulses corresponding to the weight deficiency from the target weight of the quantity of material weighed by the weighing device, the evaluating device being adapted to determine when the number of impulses fed from the counter is equal to the number of impulses fed from the analogue-digital transducer and, when the number of impulses are equal, to stop the driving means.

5. An apparatus for measuring out by weight individual quantities of loose and flowable materials, comprising a supporting frame; a material-dispensing device mounted on the supporting frame and adapted to measure out from material supplied thereto a quantity of mateiral of a weight below a chosen target weight; a weighing device mounted on the supporting frame below the dispensing device so as to receive and weigh each quantity of material measured out by the dispensing device thereby to determine the weight deficiency of said quantity from the target weight; a horizontally disposed rotary member which is constituted by a cylinder having formed in and around its peripheral surface a series of longitudinal grooves constituting chambers for measuring out from material supplied thereto small make-up quantities of material and which is arranged on the supporting frame so that the chambers thereof can discharge their contents into the quantity of material weighed by the weighing device; a sleeve for supplying material to the chambers of the rotary member, which sleeve is mounted on the supporting frame above said rotary member and has a lower edge which fits closely against the arcuate peripheral surface of the cylindrical rotary member; and means controlled by said weighing device for turning said rotary member through an angular distance dependent on the weight deficiency determined by the weighing device so that the contents of at least one of the chambers of the rotary member are discharged into the quantity of material weighed by the weighing device to make the weight of this quantity up to the target weight, and the chambers are filled with material by the said sleeve during such turning of the rotary member, the sleeve serving as a stripper for the chambers when the latter have been filled with material wherein the rotary member is arranged on the supporting frame beneath the weighing device so that the chambers of the rotary member can discharge their contents into the quantities of material weighed by the weighing device after these quantities have been discharged from the weighing device.

6. An apparatus for measuring out by weight individual quantities of loose and flowable materials, comprising a supporting frame; a material-dispensing device mounted on the supporting frame and adapted to measure out from material supplied thereto a quantity of material of a weight below a chosen target weight; a first weighing device mounted on the supporting frame below the dispensing device so as to receive and weigh each quantity of material measured out by the dispensing device thereby to determine the weight deficiency of said quantity from the target weight; a first rotary member which has provided around its periphery a series of chambers for measuring out from material supplied thereto small make-up quantities of material and which is arranged on the supporting frame so that the chambers thereof can discharge their contents into the quantity of material weighed by said first weighing device; means mounted above said first rotary member for supplying material to the chambers thereof; and means controlled by said first weighing device for turning said rotary member through an angular distance dependent on the weight deficiency determined by the first weighing device so that the contents of at least one of the chambers of the rotary member are discharged into the quantity of material weighed by the weighing device to make the weight of this quantity up to the target weight; a second weighing device mounted on the supporting frame below said first weighing device and said first rotary member so as to receive and weigh the quantity of material discharged from the first weighing device and the quantities of material dispensed from the chambers of the first rotary member, thereby to determine the weight still deficient from the target weight; a second rotary member which has provided around its periphery a series of chambers for measuring out from material supplied thereto very small make-up quantities of material and which is arranged on the supporting frame so that the chambers thereof can discharge their contents into the total quantity of material weighed by the second weighing device; and means controlled by said second weighing device for turning said second rotary member through an angular distance dependent on the weight deficiency determined by the second weighing device so that the contents of at least one of the chambers of the rotary member are discharged into the total quantity of material weighed by the second weighing device to make the weight of this quantity up to the target weight wherein the rotary member is arranged on the supporting frame beneath the weighing device so that the chambers of the rotary member can discharge their contents into the quantities of material weighed by the weighing device after these quantities have been discharged from the weighing device.

References Cited by the Examiner
UNITED STATES PATENTS

| | | | |
|---|---|---|---|
| 1,981,697 | 11/34 | Hartman | 177—81 |
| 2,659,562 | 11/53 | Could et al. | 177—119 X |
| 2,802,658 | 8/57 | Hensgen et al. | 177—1 |
| 2,901,209 | 8/59 | Bardy et al. | 177—57 |
| 2,950,894 | 8/60 | Hillman | 177—123 X |

FOREIGN PATENTS

| | | |
|---|---|---|
| 621,315 | 11/35 | Germany. |
| 492,634 | 9/38 | Great Britain. |

LEO SMILOW, *Primary Examiner.*